United States Patent [19]

Wirtz et al.

[11] Patent Number: 5,349,019
[45] Date of Patent: Sep. 20, 1994

[54] NEW COPOLYMERS, MIXTURES THEREOF WITH POLY(METH)ACRYLATE ESTERS AND THE USE THEREOF FOR IMPROVING THE COLD FLUIDITY OF CRUDE OILS

[75] Inventors: Herbert Wirtz, Eppstein/Taunus; Sigmar-Peter von Halasz, Liederbach; Michael Feustel, Kelkheim; Juliane Balzer, Frankfurt am Main, all of Fed. Rep. of Germany

[73] Assignee: Hoechst, Frankfurt am Main, Fed. Rep. of Germany

[21] Appl. No.: 116,204

[22] Filed: Sep. 2, 1993

Related U.S. Application Data

[63] Continuation of Ser. No. 879,504, May 1, 1992, abandoned, which is a continuation of Ser. No. 454,164, Dec. 21, 1989, abandoned.

[30] Foreign Application Priority Data

Dec. 24, 1988 [DE] Fed. Rep. of Germany ....... 3843922

[51] Int. Cl.$^5$ ............... C08L 33/08; C08L 33/10; C10N 30/02; C10L 1/18
[52] U.S. Cl. .................. 525/217; 525/200; 525/204; 525/216; 525/219; 525/223; 525/226; 525/228; 526/245; 526/247; 526/260; 526/263; 526/309; 526/310; 526/313; 526/320; 252/51.5 R; 252/54; 252/56 R; 252/57
[58] Field of Search ............ 525/200, 204, 216, 217, 525/219, 223, 226, 228; 526/245, 247, 260, 263, 309, 310, 313, 320; 252/51.5 R, 54, 56 R, 57

[56] References Cited

U.S. PATENT DOCUMENTS

| | | | |
|---|---|---|---|
| 3,507,932 | 4/1990 | Morduchowitz | 525/309 |
| 3,532,659 | 10/1970 | Hager | 526/245 |
| 3,642,633 | 2/1972 | Eckert | 526/320 |
| 3,817,866 | 6/1974 | Yammamoto | 252/56 |
| 3,904,385 | 9/1975 | Sweeney | 44/62 |
| 3,951,929 | 4/1976 | Sweeney | 526/328 |
| 4,141,755 | 2/1979 | Weiss | 428/522 |
| 4,547,202 | 10/1985 | Miller | 44/62 |
| 4,758,364 | 7/1988 | Seki | 252/56 R |
| 4,791,167 | 12/1988 | Saukaitis | 524/544 |
| 4,822,508 | 6/1989 | Pennewiss | 252/56 R |
| 4,867,894 | 9/1989 | Pennewiss | 252/56 R |
| 4,880,554 | 11/1989 | Newman | 525/148 |
| 4,900,569 | 2/1990 | Le | 526/245 |
| 4,968,444 | 11/1990 | Knoell | 252/56 R |

FOREIGN PATENT DOCUMENTS

| | | |
|---|---|---|
| 1231659 | 1/1988 | Canada . |
| 113138 | 7/1984 | European Pat. Off. . |
| 0120512 | 10/1984 | European Pat. Off. . |
| 0294648 | 12/1988 | European Pat. Off. . |
| 0309317 | 3/1989 | European Pat. Off. . |
| 054410 | 3/1988 | Japan ............... 526/245 |
| 537364 | 2/1946 | United Kingdom . |
| 760554 | 10/1956 | United Kingdom . |
| 1053163 | 12/1966 | United Kingdom . |
| 2189251 | 10/1987 | United Kingdom . |

OTHER PUBLICATIONS

Chemical Abstract 107(26):237777.

*Primary Examiner*—David Buttner
*Attorney, Agent, or Firm*—Connolly & Hutz

[57] ABSTRACT

New copolymers, mixtures thereof with poly(meth)acrylate esters and the use thereof for improving the cold fluidity of crude oils.

Copolymers comprising as comonomers therein from 50 to 99.9% by weight of a $C_{14}$–$C_{22}$-alkyl(meth)acrylate and 50 to 0.1% by weight of a comonomer derived from a compound comprising a single polymerizable C=C group and these copolymers or their mixture with $C_{14}$–$C_{22}$-alkyl poly(meth)acrylates having enhanced pour point depressant properties.

7 Claims, No Drawings

NEW COPOLYMERS, MIXTURES THEREOF WITH POLY(METH)ACRYLATE ESTERS AND THE USE THEREOF FOR IMPROVING THE COLD FLUIDITY OF CRUDE OILS

This application is a continuation of application Ser. No. 07/879,504 filed May 1, 1992, now abandoned, which was a continuation of application Ser. No. 07/454,164 filed Dec. 21, 1989, now abandoned.

BACKGROUND OF THE INVENTION

Depending on the provenance, crude oils contain greater or lesser fractions of dissolved n-paraffins which represent a special group of problems, because they crystallize out on lowering of the temperature and thus can lead to a deterioration in the flow properties of these oils. In pipeline transport, this crystallization can cause depositions on the wall, and in an extreme case, complete blockage of the pipeline. In addition, paraffin precipitations can also lead to complications in production, storage and further processing.

The deposition of paraffin starts with the formation of microcrystals in the form of fine platelets and needles, and the viscosity of the crude oil rises significantly. When these microcrystals grow together into a three-dimensional network, the crude oil loses its fluidity and finally solidifies. The solidification point is also called setting point (pour point) and depends on the quantity and distribution of the paraffins dissolved in the oil.

For restoring or maintaining the fluidity, there are a number of measures of a thermal or mechanical nature—for example scraping the paraffin off the inner wall of the pipe, or heating of entire pipelines. It is certainly more elegant to combat the cause of the phenomenon by the addition of so-called setting point depressants (paraffin inhibitors, pour point depressants), in most cases in quantities of a few hundred ppm.

The effect of a paraffin inhibitor is based on the fact that it co-crystallizes with the paraffins, i.e. interferes with the build-up of the regular crystal structure. At the same time, the high-molecular inhibitor molecules represent crystallization nuclei, so that the number of primarily formed microcrystals is increased. Finally, polar groups within the inhibitor molecule prevent the crystals from growing together into a network. The paraffin inhibitor thus does not change the quantity of the paraffin crystallizing out, but the size and polarity of the crystals. The consequence is that the pour point is depressed and the fluidity of the oil is maintained across a wider temperature range.

The paraffin inhibitors are in general homopolymers and copolymers based on olefins, (meth)acrylate esters, maleic acid derivatives and certain vinyl monomers. Thus, for example, homopolymers of acrylates having 18 to 24 carbon atoms in the alcohol radical are claimed in German Offenlegungsschrift 2,264,328 for the use as pour point depressants.

In European Patent 0,120,512, copolymers of long-chain acrylate esters and comonomers such as styrene, t-butylstyrene, acrylonitrile, acrylamide or vinylpyridine are described for the same intended use.

Finally, U.S. Pat. No. 4,547,202 claims copolymers of long-chain acrylate esters and certain vinylidene components for crude oils and residual oils.

A disadvantage of all the substances mentioned is that their activity is not yet sufficient, so that high use concentrations result.

SUMMARY OF THE INVENTION

For this reason, novel copolymers are sought which have improved properties as pour point depressants and still show sufficient activity even at low rates of addition.

Surprisingly, it has now been found that a marked depression of the pour point of crude oils can be achieved by means of the copolymers described below, and particularly by mixtures thereof with poly(meth)acrylates.

DETAILED DESCRIPTION OF THE INVENTION

The present invention relates to copolymers composed of 50 to 99.9% by weight of a $C_{14}$–$C_{22}$-alkyl (meth)acrylate and 50 to 0.1% by weight of a comonomer of the formula 1

in which $R_1$ is hydrogen or methyl, $R_2$ is a group of the formulae

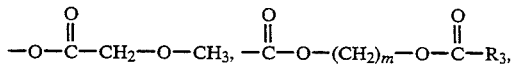

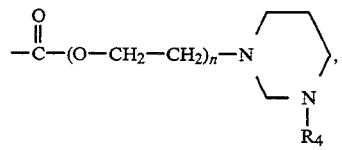

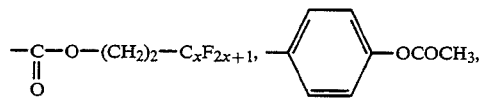

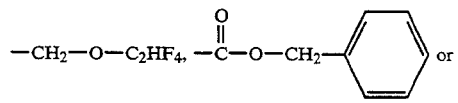

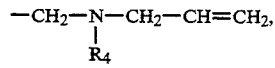

$R_3$ is $C_1$–$C_{80}$-alkyl, $C_2$–$C_{80}$-alkenyl, $C_5$- or $C_8$-cycloalkyl or -cycloalkenyl which can each be substituted by alkyl groups, or is aralkyl, alkaryl or the radical of a dimeric fatty acid, of maleic acid, of succinic acid or of a C-$C_{22}$-alkenylsuccinic acid, $R_4$ is $C_1$–$C_{80}$-alkyl, $C_1$–$C_{80}$-alkenyl, $C_5$- or $C_8$-cycloalkyl or -cycloalkenyl which can each be substituted by alkyl groups, or is aryl, aralkyl or alkaryl, $R_5$ is $C_6$–$C_{20}$-alkyl, m is 2 or 3, n is a number from 1 to 30 and x is a number from 2 to 20, and mixtures of these copolymers with $C_{14}$–$C_{22}$-alkyl poly (meth)acrylates.

Those comonomers are preferred in which $R_3$ and $R_4$ are $C_6$–$C_{36}$-alkyl, $C_6$–$C_{36}$-alkenyl, cyclohexyl, cyclohexenyl, naphthenyl, phenyl, benzyl or $C_1$–$C_4$-mono-, -di- or -trialkylphenyl or $R_3$ can also be the radical of a dimeric fatty acid, of maleic acid, of succinic acid or of a $C_6$-$C_{18}$-alkenylsuccinic acid, and x is a number from 4 to 16.

The invention also relates to polymer mixtures of 10 to 90% by weight of a $C_{14}$-$C_{22}$-alkyl poly(meth)acrylate (B) and 90 to 10% by weight of an abovementioned copolymer (A). A:B mixing ratios of 20 to 40% by weight of polymer A and 80 to 60% by weight of polymer B are preferred.

The abovementioned copolymers (A) and mixtures thereof with the $C_{14}$-$C_{22}$-alkyl poly(meth)acrylates (B) are outstandingly suitable for improving the fluidity of crude oils. Furthermore, it has been found that those copolymers (A) and mixtures thereof with the poly(meth)acrylate esters (B) are also suitable for improving the fluidity of crude oils in which the copolymer (A) contains those monomers of the above formula (1) in which $R_2$ additionally is a group of the formulae

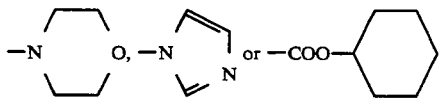

The preparation of the polymers described is carried out by conventional processes in solution in an aromatic hydrocarbon, hydrocarbon mixture or an n-paraffin at 50°-100° C. and with the starters conventional for free-radical polymerizations. The proportion by weight of the monomers is here between 50 and 90%.

In some cases, the polymers can be prepared by two routes, namely in the case of the acylated hydroxyalkyl acrylates. On the one hand, the hydroxyalkyl acrylates can be copolymerized directly with the (meth)acrylate esters and then esterified by the usual method or, on the other hand, the monomeric diester can also be prepared first and then copolymerized. Because of the different reactivities, the two preparation methods result in different molecular weight distributions. Which of the copolymers shows the greater effect is then dependent on the composition of the crude oil.

The polymers and polymer mixtures described are distinguished by a broad activity and allow an improvement in the flow properties of many crude oils at used quantities of 10-1,000 ppm.

The examples which follow are intended to explain the invention without limiting it.

I. PREPARATION OF THE MONOMERS

The preparation of a few monomers will be described below, if these are not common commercial products.

EXAMPLE 1

Preparation of 2-naphthenoyloxyethyl acrylate 148 g (0.5 mol) of naphthenic acid in 200 g of toluene are first introduced into a 1 l four-necked flask with a stirrer, contact thermometer and reflux condenser as well as a gas inlet tube, and heated to 50° C. 59.5 g (0.5 mol) of thionyl chloride are added thereto dropwise in the course of 30 minutes, and reflux is maintained for one further hour after the end of the addition. The mixture is allowed to cool again to 50° C. and, while passing through nitrogen, a solution of 58 g (0.5 mol) of hydroxyethyl acrylate in 58 g of toluene is added in the course of 30 minutes. After the end of the addition, the mixture is held at 60° C. for 4 hours and a vigorous stream of nitrogen is passed through the solution during this period. Toluene is removed at 75° C. and 20 mm Hg. This gives 98 g (quantitative yield) of a brown oil.

The other claimed esters can be prepared from hydroxypropyl (meth)acrylate in an analogous manner.

If the subsequent polymerization is to be carried out in high-boiling aromatics or in n-paraffins, the esterification can also take place directly in these solvents. Of course, there is then no distillation of the solvent.

EXAMPLE 2

Preparation of Benzyl Acrylate 144 g (2 mols) of acrylic acid, which have been inhibited with 1.4 g of hydroquinone monomethyl ether, are dissolved in 139 g of a high-boiling aromatics mixture in a 1 l four-necked flask with stirrer, contact thermometer, water separator and gas inlet tube. 3.2 g of p-toluenesulfonic acid are added thereto, the mixture is heated to 70° C. and, at this temperature, 216 g (2 mols) of benzyl alcohol are allowed to run in over a period of 10 minutes. After the end of the addition, the mixture is heated to reflux. To accelerate the removal of water, air is passed through the solution. The reaction is complete after about 5 hours. The progress of the reaction is monitored via the acid number. After 5 hours, the latter gives a conversion of about 97%.

The n-alkyl (meth)acrylates and cyclohexyl acrylates are prepared in the same way in accordance with these instructions.

EXAMPLE 3

Preparation of 1-acryloyloxyethyl-3-tallow-fatty alkylhexahydropyrimidine.

1,000 g (2.90 mols) of tallow-fatty alkyl-propylenediamine are dissolved in 1,500 ml of toluene in a 6 l four-necked flask with a stirrer, contact thermometer and water separator. 86.95 g (2.90 mols) of paraformaldehyde are added thereto in portions at room temperature. During the addition, attention must be paid to foaming. After the end of the addition, the mixture is boiled for 6 hours under a water separator. 51 ml of water in total are separated out. After the end of the reaction, the solvent is removed in vacuo. This gives 1,030 g of a light yellow paste, which is then ethoxylated at 130° C. by the usual methods. For the esterification with acrylic acid, the ethoxylate thus obtained, of molecular weight 410 corresponding to 1.2 mols of ethylene oxide/mol, is dissolved together with 181 g (25 mols) of acrylic acid in 500 g of toluene, 1 g of p-toluenesulfonic acid is added, and the whole is heated for 5 hours at 110°-130° C. under a water separator. 34 g of water in total separate out (about 75% of theory). The solvent is then removed in vacuo. The crude material thus obtained was not further purified for the copolymerizations.

II. PREPARATION OF THE POLYMERS

EXAMPLE 1

168 g (0.30 mol) of a stearyl acrylate, prepared analogously to Example I.2, 58% in toluene, and 3.3 g (0.028 mol) of hydroxyethyl acrylate were first introduced, together with 1.0 g of dodecylmercaptan, into a 1 l four-necked flask fitted with a stirrer extending to near the wall, reflux condenser, contact thermometer, gas inlet tube and dropping funnel. At an internal temperature of 60° C., a solution of 0.5 g of azo-bis-(isobutyronitrile) in 27 g of toluene is added thereto over a period of 30 minutes, while passing through nitrogen. After the exothermic reaction has subsided, the mixture is kept for a further 2 hours at 80° C. For the esterification of the free hydroxyl group, 7.5 g (0,028 mol) of stearic acid chloride are added dropwise at 50° and stirring is continued at this temperature until hydrogen chloride is no longer evolved. This gives a light-brown copolymer which is adjusted with toluene to 50% solids content. K value (5% in toluene/25° C.) according to Ubbelohde: 19.8.

EXAMPLE 2

As in Example II.1, 135 g (0.29 mol) of 58% stearylacrylate are first introduced at 50° C. together with 9.5 g (0.026 mol) of a 2-stearoyloxyethyl acrylate prepared analogously to Example I.1. After the addition of 0.5 g of azo-bis-(isobutyronitrile) in 16 g of toluene, the mixture is heated at 50, 60, 70, 80° and 90° C. (bath temperature) for 1 hour at each of these temperatures. This gives a light-brown copolymer which is adjusted with toluene to a solids content of 50%. K value (5% in toluene/25° C.) according to Ubbelohde: 48.9.

The polymerizations with the acetyl and naphthenoyl derivatives also proceed correspondingly.

EXAMPLE 3

As in Example II.1, 75 g (0,178 mol) of 60% $C_{12}$–$C_{14}$-alkyl acrylate in toluene are copolymerized with 45 g (0.38 mol) of vinyl methoxyacetate. The starter used is a solution of 0.5 g of azo-bis-(isobutyronitrile) in 10 g of toluene. The mixture is kept at 50, 60, 70, 80° and 90° C. for 1 hour at each of these temperatures, giving a yellow polymer of K value 31.5.

EXAMPLE 4

As in Example II.1, 11.7 g (0.35 mol) of stearyl acrylate in $C_{12}$–$C_{16}$-n-paraffin are copolymerized together with 11.7 g (0.025 mol) of 1-acryloyloxyethyl-3-tallow-fatty alkyl-hexahydropyrimidine. 1 g of tert.-butyl perpivalate, dissolved in 20 g of $C_{12}$–$C_{16}$-n-paraffin, is used as the starter. The solution should not fall below 50% of monomers in total. When the temperature profile described in Examples II.2 and II.3 is maintained, a highly viscous light-brown product of K value 45.40 is obtained.

Analogously to the methods described in Examples II.2, II.3 and II.4, long-chain acrylates can be copolymerized with the following monomers listed in the table. The molar ratios and the K values are listed for some typical polymers.

| Monomer I<br>$CH_2=CHCOR$<br>$\parallel$<br>$O$ | Monomer II | Molar ratio | K value | Example |
| --- | --- | --- | --- | --- |
| R = $C_{18}H_{37}$ | 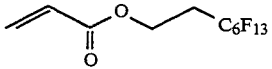 | 97:3 | 40.3 | 5 |
| R = $C_{18}H_{37}$ | 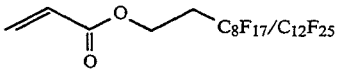 | 95:5 | 44.8 | 6 |
| R = $C_{18}H_{37}$ | 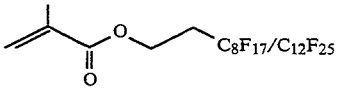 | 95:5 | 48.1 | 7 |
| R = $C_{18}H_{37}$ | 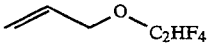 | 99.5:0,5 | 44.3 | 8 |
| R = $C_{18}H_{37}$ | 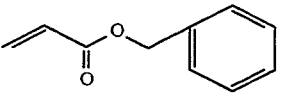 | 90:10 | 37.8 | 9 |
| R = $C_{18}H_{37}$ | 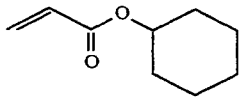 | 90:10 | 39.2 | 10 |
| R = $C_{18}H_{37}$ | 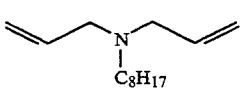 | 99:1 | 34.1 | 11 |

| Monomer I<br>$CH_2=CHCOR$<br>$\parallel$<br>$O$ | Monomer II | Molar ratio | K value | Example |
|---|---|---|---|---|
| R = $C_{18}H_{37}/C_{22}H_{43}$ | 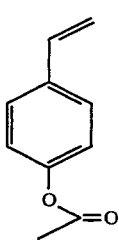 | 99:1 | 34.5 | 12 |
| R = $C_{18}H_{37}$ | 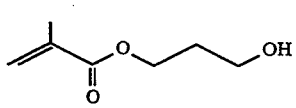 | 99:1 | 24.5 | 13 |
| R = $C_{18}H_{37}/C_{22}H_{43}$ | 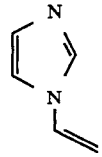 | 90:10 | 36.3 | 14 |

The effectiveness of the copolymers investigated is described by reference to the determination of the pour points. This is carried out according to DIN ISO 3016. Accordingly, after prior heating, the sample is cooled under fixed conditions and tested for fluidity at temperature intervals of 3° C. each.

Using the compounds and mixtures according to the invention, pour point measurements were carried out on an Indian oil which has a pour point of 29° C. in untreated samples. The results are summarized in the following table:

| Product | Quantity used (ppm) | Pour point (°C.) |
|---|---|---|
| Polymer according to Example 1 | 300 | 21 |
| Polymer according to Example 1 | 500 | 17 |
| Mixture of 20% of polymer according to Example 1 and 80% of $C_{18}$–$C_{22}$-alkyl polyacrylate | 300 | 12.5 |
| Mixture of 20% of polymer according to Example 1 and 80% of $C_{18}$–$C_{22}$-alkyl polyacrylate | 500 | 10 |
| Polymer according to Example 2 | 300 | 20.5 |
| Polymer according to Example 2 | 500 | 18 |
| Mixture of 20% of polymer according to Example 2 and 80% of $C_{18}$–$C_{22}$-alkyl polyacrylate | 300 | 12 |
| Mixture of 20% of polymer according to Example 2 and 80% of $C_{18}$–$C_{22}$-alkyl polyacrylate | 500 | 11 |
| Polymer according to Example 3 | 300 | 29 |
| Polymer according to Example 3 | 500 | 25 |
| Mixture of 20% of polymer according to Example 3 and 80% of $C_{18}$–$C_{22}$-alkyl polyacrylate | 300 | 20 |
| Mixture of 20% of polymer according to Example 3 and 80% of $C_{18}$–$C_{22}$-alkyl polyacrylate | 500 | 15.5 |
| Polymer according to Example 4 | 300 | 21 |
| Polymer according to Example 4 | 500 | 19.5 |
| Mixture of 20% of polymer according to Example 4 and 80% of $C_{18}$–$C_{22}$-alkyl polyacrylate | 300 | 15 |
| Mixture of 20% of polymer according to Example 4 and 80% of $C_{18}$–$C_{22}$-alkyl polyacrylate | 500 | 17 |
| Polymer according to Example 5 | 300 | 19 |
| Polymer according to Example 5 | 500 | 17 |
| Mixture of 20% of polymer according to Example 5 and 80% of $C_{18}$–$C_{22}$-alkyl polyacrylate | 300 | 11 |
| Mixture of 20% of polymer according to Example 5 and 80% of $C_{18}$–$C_{22}$-alkyl polyacrylate | 500 | 10 |
| Polymer according to Example 6 | 300 | 20 |
| Polymer according to Example 6 | 500 | 18 |
| Mixture of 20% of polymer according to Example 6 and 80% of $C_{18}$–$C_{22}$-alkyl polyacrylate | 300 | 13 |
| Mixture of 20% of polymer according to Example 6 and 80% of $C_{18}$–$C_{22}$-alkyl polyacrylate | 500 | 12.5 |
| Polymer according to Example 7 | 300 | 19 |
| Polymer according to Example 7 | 500 | 17.5 |
| Mixture of 20% of polymer according to Example 7 and 80% of $C_{18}$–$C_{22}$-alkyl polyacrylate | 300 | 13.5 |
| Mixture of 20% of polymer according to Example 7 and 80% of $C_{18}$–$C_{22}$-alkyl polyacrylate | 500 | 12 |
| Polymer according to Example 8 | 300 | 16.5 |
| Polymer according to Example 8 | 500 | 11 |
| Mixture of 20% of polymer according to Example 8 and 80% of $C_{18}$–$C_{22}$-alkyl polyacrylate | 300 | 10 |
| Mixture of 20% of polymer according to Example 8 and 80% of $C_{18}$–$C_{22}$-alkyl polyacrylate | 500 | 7 |
| Polymer according to Example 9 | 300 | 19.5 |
| Polymer according to Example 9 | 500 | 18 |
| Mixture of 20% of polymer according to Example 9 and 80% of $C_{18}$–$C_{22}$-alkyl polyacrylate | 300 | 11.5 |
| Mixture of 20% of polymer according to Example 9 and 80% of $C_{18}$–$C_{22}$-alkyl polyacrylate | 500 | 8 |
| Polymer according to Example 10 | 300 | 20.5 |
| Polymer according to Example 10 | 500 | 18 |
| Mixture of 20% of polymer according to Example 10 and 80% | 300 | 10.5 |

| Product | Quantity used (ppm) | Pour point (°C.) |
|---|---|---|
| of $C_{18}$-$C_{22}$-alkyl polyacrylate | | |
| Mixture of 20% of polymer according to Example 10 and 80% of $C_{18}$-$C_{22}$-alkyl polyacrylate | 500 | 8.5 |
| Polymer according to Example 11 | 300 | 22.5 |
| Polymer according to Example 11 | 500 | 18 |
| Mixture of 20% of polymer according to Example 11 and 80% of $C_{18}$-$C_{22}$-alkyl polyacrylate | 300 | 16.5 |
| Mixture of 20% of polymer according to Example 11 and 80% of $C_{18}$-$C_{22}$-alkyl polyacrylate | 500 | 13 |
| Polymer according to Example 12 | 300 | 19 |
| Polymer according to Example 12 | 500 | 16 |
| Mixture of 20% of polymer according to Example 12 and 80% of $C_{18}$-$C_{22}$-alkyl polyacrylate | 300 | 18 |
| Mixture of 20% of polymer according to Example 12 and 80% of $C_{18}$-$C_{22}$-alkyl polyacrylate | 500 | 14 |
| Polymer according to Example 13 | 300 | 22 |
| Polymer according to Example 13 | 500 | 18 |
| Mixture of 20% of polymer according to Example 13 and 80% of $C_{18}$-$C_{22}$-alkyl polyacrylate | 300 | 18 |
| Mixture of 20% of polymer according to Example 13 and 80% of $C_{18}$-$C_{22}$-alkyl polyacrylate | 500 | 11 |
| Polymer according to Example 14 | 300 | 18 |
| Polymer according to Example 14 | 500 | 16 |
| Mixture of 20% of polymer according to Example 14 and 80% of $C_{18}$-$C_{22}$-alkyl polyacrylate | 300 | 13 |
| Mixture of 20% of polymer according to Example 14 and 80% of $C_{18}$-$C_{22}$-alkyl polyacrylate | 500 | 11 |
| ® Paradyne 70 | 300 | 25.5 |
|  | 500 | 23.0 |
| ® Paradyne 85 | 500 | 30.5 |
| ® Shellswim 5 T | 500 | 14.0 |
| ® Shellswim 11 T | 300 | 20.5 |
|  | 500 | 14.0 |

The four last-mentioned products represent commercially available flow improvers.

We claim:

1. A mixture of: a) 10 to 90% by weight of a copolymer consisting of 50 to 99.9% by weight of only one $C_{14}$-$C_{22}$-alkyl methacrylate or only one $C_{14}$-$C_{22}$-alkyl acrylate and 50 to 0.1% by weight of only one comonomer selected from the group consisting of comonomers of the formula I

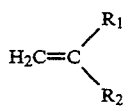 (I)

in which $R_1$ is hydrogen or methyl,
$R_2$ is a group of the formulae

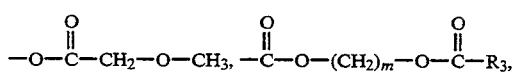

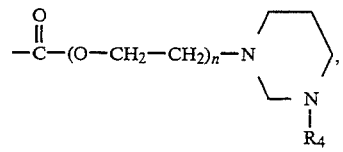

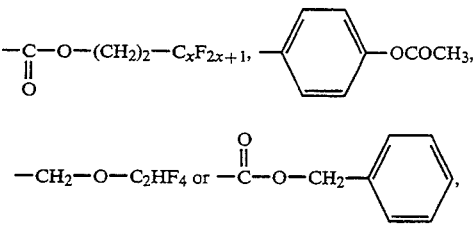

$R_3$ is $C_1$-$C_{80}$-alkyl, $C_6$-$C_{36}$-alkenyl, $C_5$- or $C_6$-cycloalkyl or -cycloalkenyl which can each be substituted by alkyl groups, or is aralkyl, alkaryl or the radical of a dimeric fatty acid, or maleic acid, or succinic acid or of a $C_6$-$C_{22}$-alkenylsuccinic acid, $R_4$ is $C_1$-$C_{80}$-alkyl, $C_1$-$C_{80}$-alkenyl, $C_5$- or $C_6$-cycloalkyl or -cycloalkenyl which can each be substituted by alkyl groups, or is aryl, aralkyl or alkaryl,
m is 2 or 3,
n is a number from 1 to 30 and X is a number from 12 to 20, and; b) 90 to 10% by weight of a poly-$C_{14}$-$C_{22}$-alkyl methacrylate or poly-$C_{14}$-$C_{22}$-alkylacrylate.

2. A mixture as claimed in claim 1, containing a comonomer of the formula (I), having a group $R_2$ in which $R_4$ where present is $C_6$-$C_{36}$-alkyl, $C_6$-$C_{36}$-alkenyl, cyclohexyl, cyclohexenyl, naphthenyl, phenyl, benzyl, $C_1$-$C_4$-mono-, -di- or -tri-alkylphenyl or $R_3$ where present is the radical of a dimeric fatty acid, of maleic acid, of succinic acid or of a $C_9$-$C_{18}$-alkenylsuccinic acid.

3. A mixture according to claim 1, wherein a) is 20 to 40% by weight of said mixture; and b) is 80 to 60% by weight of said mixture.

4. A mixture as claimed in claim 1, wherein said poly-$C_{14}$-$C_{22}$-alkylacrylate is poly-$C_{18}$-$C_{22}$-alkylacrylate.

5. A mixture of: a) 10 to 90% by weight of a copolymer consisting of 50 to 99.9% by weight of only one $C_{14}$-$C_{22}$-alkyl methacrylate or only one $C_{14}$-$C_{22}$-alkyl acrylate and 50 to 0.1% by weight of only one comonomer selected from the group consisting of comonomers of the formula I

 (I)

in which $R_1$ is hydrogen or methyl,
$R_2$ is a group of the formula

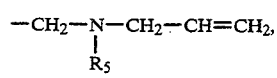

wherein $R_5$ is $C_6$-$C_{20}$-alkyl, and b) 90 to 10% by weight of a poly-$C_{14}$-$C_{22}$-alkyl methacrylate or poly-$C_{14}$-$C_{22}$-alkylacrylate.

6. A mixture according to claim 5, wherein a) is 20 to 40% by weight of said mixture and b) is 80 to 60% by weight of said mixture.

7. A mixture as claimed in claim 5, wherein said poly-$C_{14}$-$C_{22}$-alkylacrylate is poly-$C_{18}$-$C_{22}$-alkylacrylate.

* * * * *